United States Patent Office 3,175,014
Patented Mar. 23, 1965

3,175,014
ISOMERIZATION OF HYDRONAPHTHALENES IN THE PRESENCE OF AN ALUMINA-PLATINUM-BORIA CATALYST
Henry D. Ballard, Jr., Dolton, and Owen H. Thomas, South Holland, Ill., assignors to Sinclair Research, Inc., Wilmington, Del., a corporation of Delaware
No Drawing. Filed Sept. 28, 1961, Ser. No. 141,305
5 Claims. (Cl. 260—666)

This invention relates to the isomerization of tetralin and decalin in the presence of a select catalyst to produce "isotetralins" and "isodecalins."

"Isotetralins" and "isodecalins" are products formed, respectively, by the isomerization of tetrahydronaphthalenes, more commonly termed "tetralin," and decahydronaphthalenes, more commonly termed "decalin" and have found extensive use as solvents in varnishes and lacquers. In addition "isotetralins" and "isodecalins" have been found to be valuable intermediates for the production, for example, of methylhydrindans, methylindans, methylindenes and dimethy-[3,3,0]-bicyclooctanes, all compounds of considerable commercial value. Methylindenes, for instance, have become exceedingly important in recent years as synthetic resin intermediates, for example, in the preparation of synthetics bearing the general designation of coumarone-indene copolymers.

The terms "isotetralins" and "isodecalins" as used in the specification and claims means the isomers produced by the isomerization of tetrahydronaphthalene or decahydronaphthalene wherein at least one ring of the tetrahydronaphthalene or decahydronaphthalene has been isomerized to a ring containing one less carbon but otherwise containing a similar carbon and hydrogen content. Examples of the "isotetralins" are α-methylindane and β-methylindane. "Isodecalins" produced by the isomerization of decahydronaphthalenes in accordance with the present invention is a hydrocarbon fraction substantially free of aromatics, having a boiling range of about 155 to 185° C., an index of refraction greater than 1.46 and consisting essentially of methyl hydrindanes and dimethyl-[3,3,0]-bicyclooctanes.

In accordance with the present invention tetrahydronaphthalenes, decahydronaphthalenes or mixtures thereof are converted to "isotetralins" and "isodecalins" by contacting them in the presence of molecular hydrogen with catalyst consisting essentially of a platinum group metal and boria on activated alumina at a temperature of about 400 to 900° F., preferably about 500 to 700° F., a pressure of about 200 to 2000 p.s.i.g., preferably about 300 to 1000 p.s.i.g., a weight hourly space velocity of about 0.1 to 20, preferably about .5 to 5 and a hydrogen to hydrocarbon mole ratio of at least about 0.5:1, preferably about 0.5 to 10:1, at the reactor exit. Whether isodecalins or/and isotetralins are obtained is not dependent so much on the feed as the reaction conditions employed. If desired, hydrogen halide, for example, hydrogen chloride can be added to the reaction system to increase conversion. The process of the present invention is of advantage over prior art processes in that it proceeds at a more rapid rate with little or no coke formation.

The feedstock subjected to isomerization can be tetrahydronaphthalenes, decahydronaphthalenes or mixtures thereof. Inasmuch as naphthalene under the isomerization conditions of the present invention is hydrogenated to tetrahydronaphthalene and/or decahydronaphthalene, the starting feed can be or include naphthalene. The tetrahydronaphthalene and decahydronaphthalene feed materials of the present invention can be obtained from hydrocarbon oils or by the hydrogenation of naphthalene. Naphthalene is a product of petroleum oils or coal tar distillation operations. In actual practice the feedstock of the present invention can be a mixture on naphthalene, tetrahydronaphthalenes and decahydronaphthalenes such as is produced by the hydrodesulfurization of sulfur-containing naphthalenes. Since the catalyst of the present invention is an excellent hydrogenation catalyst under the conditions employed; the relative amounts of naphthalene, tetralin and decalin when naphthalene or tetralin containing feeds are used is determined by the thermodynamic equilibrium. The feedstock may also include other compounds which are not detrimental to the desired isomerization reaction, as for example methylhydrindenes, methylindans, methylindenes and dimethyl or ethyl-[3,3,0]-bicyclooctanes. The feed preferably should contain less than about 15% of alkyl benzenes, paraffins, monocycloparaffins, acyclic olefins and acetylenes. It is also preferred that the feedstock contains only small quantities of sulfur-containing impurities since these tend to poison the catalyst of the present invention.

The catalyst employed in the present invention includes catalytically effective amounts of a noble or platinum group metal and boria supported on an alumina base. The catalyst generally contains about 0.01 to 2 weight percent, preferably 0.1 to 1 weight percent, of one or more of the platinum metals of groups VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form, then it is preferred that it be so finely divided that it is not detectable by X-ray diffraction means, i.e. that it exists as crystals of less than 50 Angstrom units size. Of the noble metals platinum, palladium and rhodium are preferred.

The boria component is surface dispersible on the support and it is employed in amounts sufficient to enhance the acidity of the alumina support and such amounts are, therefore, preferably added in direct proportion to the area of the support. For instance, the amount of boria will usually be about 3 to 5 to 20 weight percent and preferably about 8 to 15 weight percent of the catalyst. These amounts are particularly effective on alumina having surface areas of about 350 to 550 square meters per gram (BET) before use.

The noble metal and boria constituents of the catalyst are deposited on an absorptive alumina base of the activated or calcined type. The alumina base is usually the major component of the catalyst, generally constituting at least about 75 weight percent on the basis of the catalyst and preferably at least about 80 to 90 percent. The catalyst base is an activated or gamma-alumina such as those derived by calcination of amorphous hydrous alumina, alumina monohydrate, alumina trihydrate or their mixtures. The catalyst base precursor most advantageously is a mixture predominating in, or containing a major proportion of, for instance about 65 to 95 weight percent, one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillonite, halloysite, etc.), titania, zirconia, etc. or their mixtures. Although the components of the catalyst can vary as stated, the preferred catalyst contains platinum and boria deposited on activated alumina.

As previously stated the preferred catalyst base material is an activated or gamma-alumina made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst base can be characterized by large surface area ranging from about 350 to about 550 or more square meters/gram when in the virgin state as determined, for example, by the BET absorption technique. A low area catalyst base prepared by treating the predominantly trihydrate base precursor is described in U.S. Patent No. 2,838,445. This base when in the virgin state has substantially no pores of radius less than 10 Angstrom units and the surface area of the catalyst is less than 350 square meters/gram and most advantageously is in the range of about 150 to 300 square meters/gram.

The platinum group metal, e.g. platinum, component of the catalyst can be added to the alumina base by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750° to 1200° F. or more to provide the activated or gamma alumina modifications. The boria component can be added to the catalyst in any stage of its preparation. It may be incorporated in the support either before or after the addition of the Group VII metal. The catalyst can be used as a moving or fluidized bed or in any other convenient type of handling system. The fixed bed system seems most advantageous at this time and the space velocity will in most cases be from about 0.1 to 20:1, preferably about 0.5 to 5:1, weights of hydrocarbon per weight of catalyst per hour (WHSV).

The catalyst of the present invention can be easily regenerated employing conventional procedures, for instance by subjecting it to an oxygen-containing gas at temperatures sufficient to burn off carbon deposited on the catalyst during the conversion of petroleum hydrocarbon feedstock. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of the combustion is below about 1000° F.

The following examples will serve to illustrate the present invention but are not to be considered limiting.

EXAMPLE I (A) *Preparation of noble metal-alumina composition*

A noble metal-alumina composition of the kind described in U.S. Patent No. 2,838,444 can be employed in preparing the catalyst used in the process of our invention. The composition of this application can be made as follows: Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to $<0.2\%$ chloride by successive filtrations and reslurryings in deionized water until the desired chloride concentration is reached. In each reslurrying, ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-Red Moisture Meter containing a 125-watt bulb, Cat. No. 26675. The resulting mixture is forced through a die plate having holes 1/16" in diameter bolted to a 3½" welding engineers screw extruder. The resulting strands are broken to particles of length varying generally between about 1/16" to 1".

The particles are dried at 230° F. and calcined by heating to 925° F. in a flow of nitrogen gas followed by a flow of air while the composition is maintained at a temperature in the range of 865° F. to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

(B) *Preparation of noble metal-boria-alumina catalyst*

A platinum-alumina composition prepared essentially as described above, except that air was used for the complete calcination procedure and containing about 0.6% platinum was employed in preparing the noble metal-boria-alumina catalyst by the following procedure. 300 g. of the platinum-alumina composition were weighed into a 6" crystallizing dish. 59 g. of $H_3BO_3$ were dissolved in 279 ml. of deionized water by heating to boiling. The hot boric acid solution was poured over the catalyst and stirred thoroughly with a rubber spatula. The catalyst was placed in a forced air drying oven, set at 140° C., for 4 hours. The catalyst was stirred occasionally while drying. The oven dried catalyst was transferred to a sagger and placed in a muffle furnace preheated to 1000° F. The catalyst was held at 1000° F. for 2 hours and cooled in a desiccator. Analysis: 9.95% $B_2O_3$.

An example of pre-activation follows: 40 grams of this catalyst were supported on glass beads in the center of a 1-inch I.D. Universal Stainless Steel Reactor. The reactor was set in place in a bronze-block furnace controlled by "Microswitch" thermostats. The catalyst was heated to 800° F. under atmospheric pressure of pure hydrogen flowing at about 2 cu. ft./hr. These conditions were maintained for 16 hours. At this time the reactor is cooled to operating temperatures and reaction conditions are established for processing the paraffin feed.

EXAMPLE II

A catalyst prepared in accordance with the method of Example I above and containing approximately 0.55 weight percent platinum and approximately 7.23 weight percent boria on activated alumina was charged to a reactor and reduced at 600° F. Essentially pure tetrahydronaphthalene was passed over this catalyst in the presence of molecular hydrogen at a temperature of 601° F., a pressure of 300 p.s.i.g. and a weight hourly space velocity of 2.01. The hydrogen to hydrocarbon ratio was 10.1 to 1. Under these conditions the tetrahydronaphthalene (tetralin) was rapidly hydrogenated to decahydronaphthalene (decalin). Analysis of the products showed:

| | Percent |
|---|---|
| Tetralin | 0.7 |
| Cis Decalin | 8.0 |
| Trans Decalin | 63.8 |
| Total Isodecalin | 27.5 |

No cracked products were formed.

We claim:
1. A process for isomerizing a hydronaphthalene selected from the group consisting of tetrahydronaphthalene and decahydronaphthalene which comprises contacting said hydronaphthalene in the presence of molecular hydrogen with a catalyst consisting essentially of a catalytic amount of a platinum group metal and about 3 to 20 weight percent boria on activated alumina at a temperature of about 400 to 900° F., a pressure of about 200 to 2000 p.s.i.g. and a weight hourly space velocity of about 0.1 to 20.

2. The process of claim 1 wherein the platinum group metal is present in an amount of about 0.01 to 2 weight percent, the boria is present in amounts of about 3 to 20 weight percent and the activated alumina constitutes at least about 75 weight percent on the basis of the catalyst.

3. The process of claim 2 wherein the platinum group metal is platinum.

4. The process of claim 3 wherein the temperature is about 500 to 700° F., the pressure about 300 to 1000 p.s.i.g. and the weight hourly space velocity about .5 to 5.

5. A process for the production of isotetralins and isodecalins which comprises isomerizing a mixture of naphthalene, tetrahydronaphthalenes and decahydronaphthalenes by contacting said mixture in the presence of molecular hydrogen with a catalyst consisting essentially of a catalytic amount of a platinum group metal and about 3 to 20 weight percent boria on activated alumina at a temperature of about 400 to 900° F., a pressure of about 200 to 2000 p.s.i.g. and a weight hourly space velocity of about 0.1 to 20.

References Cited in the file of this patent

UNITED STATES PATENTS

| 2,416,966 | Thomas et al. | Mar. 4, 1947 |
| 2,428,923 | Thomas et al. | Oct. 14, 1947 |
| 2,823,239 | Lang et al. | Feb. 11, 1958 |
| 3,000,983 | Sanford et al. | Sept. 19, 1961 |
| 3,079,447 | Bartlett et al. | Feb. 26, 1963 |

FOREIGN PATENTS

| 487,393 | Canada | Oct. 21, 1952 |